(12) United States Patent
Castellano

(10) Patent No.: US 7,334,641 B2
(45) Date of Patent: Feb. 26, 2008

(54) COMPOSITION AND METHOD TO ENHANCE RECOVERY FROM OIL WELLS

(76) Inventor: Nicholas Castellano, 8446 E. Valley Vista Cir., Mesa, AZ (US) 85207

( * ) Notice: Subject to any disclaimer, the term of this patent is extended or adjusted under 35 U.S.C. 154(b) by 0 days.

(21) Appl. No.: 11/481,093

(22) Filed: Jul. 5, 2006

(65) Prior Publication Data

US 2007/0007004 A1    Jan. 11, 2007

Related U.S. Application Data

(60) Provisional application No. 60/696,615, filed on Jul. 5, 2005.

(51) Int. Cl.
*E21B 43/22* (2006.01)
(52) U.S. Cl. .............. 166/371; 166/246; 166/300; 507/201
(58) Field of Classification Search .............. None
See application file for complete search history.

(56) References Cited

U.S. PATENT DOCUMENTS

2006/0199739 A1*  9/2006  Messerschmidt et al. ... 504/357

\* cited by examiner

*Primary Examiner*—Zakiya W. Bates
(74) *Attorney, Agent, or Firm*—Chandler & Udall, LLP; Dale F. Regelman

(57) ABSTRACT

A formulation and method to enhance recovery from an oil wherein the method supplies a mixture of petroleum distillates and terpenoid compounds, and a salt extraction formulation comprising a mixture of humic acid and fulvic acid. The method discontinues the extraction of materials from the oil well, disposing the mixture of petroleum distillates and terpenoid compounds into the oil well, and disposes the salt extraction formulation into the oil well. The method recirculates the oil well, and then returns the oil well to service.

18 Claims, 10 Drawing Sheets

COMPOSITION AND METHOD TO ENHANCE RECOVERY FROM OIL WELLS

CROSS-REFERENCE TO RELATED APPLICATIONS

This Application claims priority from a U.S. Provisional Application having Ser. No. 60/696,615 filed Jul. 5, 2005.

BACKGROUND OF THE INVENTION

With ever increasing environmental pressures being placed on the oil industry it has become necessary to develop and employ products and methods of well treatment which can perform in a timely fashion, be cost effective and conform to the stricter controls now in place.

It is known in the art that oil fields can become extremely viscous due to a heavy concentration of paraffin and asphaltene in the formation. These deposits can result in reduced oil production, fouling of flow lines and down hole tubing, under deposit corrosions, reductions in gas production, and increased pumping costs due to pumping a high viscosity fluid. Each of these conditions individually can result in lost revenue. The combination of two or more of these conditions will lead to a significant revenue loss to the well owner, as well as additional income spent due to clean up of oil spills caused by under deposit corrosion. Moreover, the differing oxygen concentrations in bulk oil with respect to the oxygen levels extant beneath the deposit result in localized, rapid corrosion of the piping and eventual oil leaks.

SUMMARY OF THE INVENTION

Applicant's invention comprises a formulation and method to enhance recovery from an oil well field. Applicant's method supplies a mixture of petroleum distillates and terpenoid compounds, and a salt extraction formulation comprising a mixture of humic acid and fulvic acid. The method discontinues the extraction of materials from the oil well, disposes the mixture of petroleum distillates and terpenoid compounds into the oil well, and disposes the salt extraction formulation into the oil well. The method recirculates the oil well, and then returns the oil well to service.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
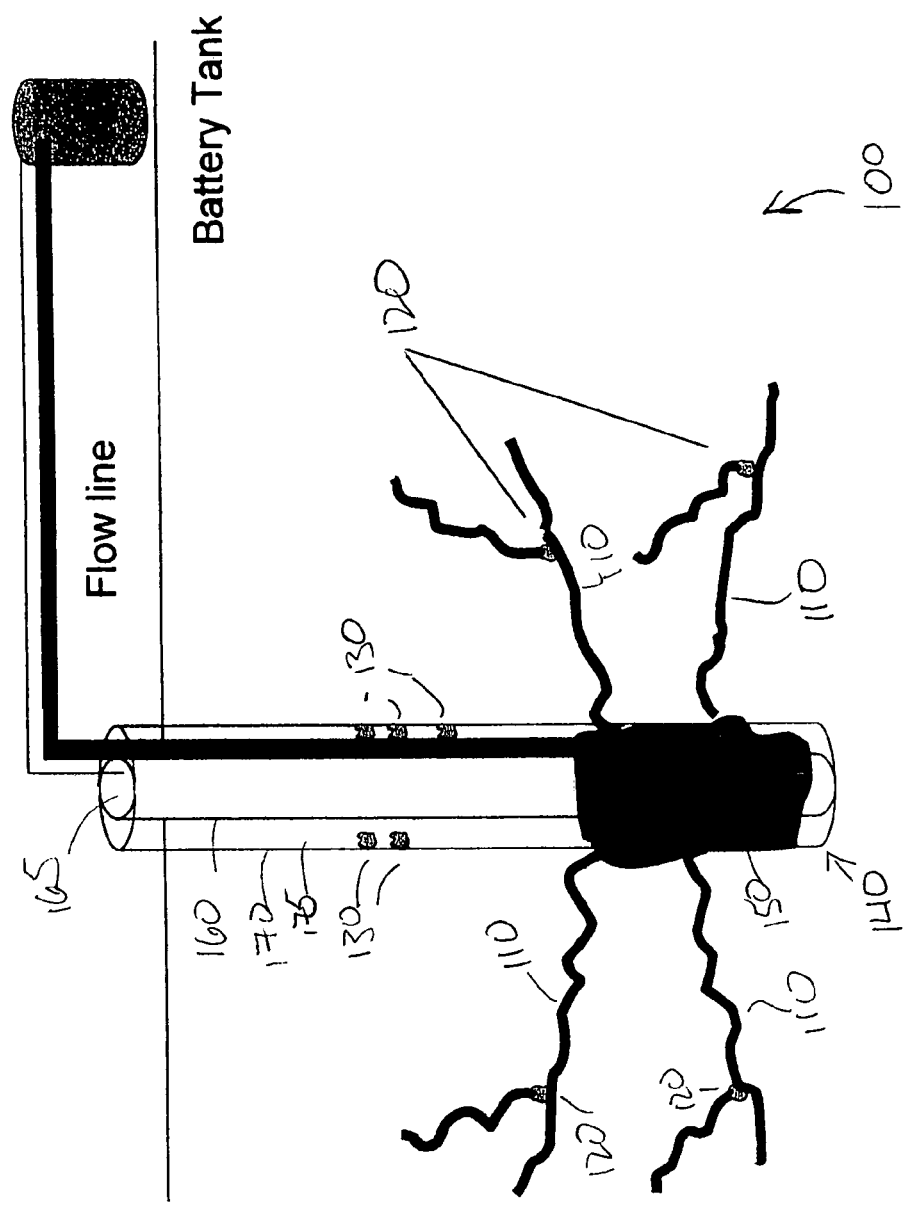
FIG. 1 is a perspective view of an oil well field.

Referring now to FIG. 1, oil field 100 includes oil well 140. Oil well 140 is disposed in near vicinity to a plurality of oil-containing fissures 110. Oil well 140 typically comprises a first tubular assembly 160 disposed within a second tubular assembly 170. The combination of tubular assemblies 160 and 170 define two separated lumens, namely lumen 165 and lumen 175. Oil is removed from fissures 110, and pumped upwardly through lumen 175.

In the illustrated embodiment of FIG. 1, blockage materials 120 are shown blocking oil-containing fissures 110. In addition, blockage materials 130 are shown blocking portions of lumen 175.

As a general matter, blockage materials 120 and 130 comprise a plurality of linear, branched, and/or cyclic hydrocarbons, sometimes referred to as paraffins or waxes, in combination with one or more higher molecular, polar, aromatic molecules sometimes referred to as "asphaltenes."

Many of the paraffin compounds comprise more than 22 carbon atoms. Compounds such as botryococcane, a $C_{34}$ branched alkane, and β-carotene, a $C_{40}$ cycloalkane, have been identified in paraffin blockage materials. Moreover, deposits in pipelines can also comprise $C_{75}$ compounds, i.e. asphaltenes. As those skilled in the art will appreciate, asphaltenes comprise a plurality of compounds, some of which comprise fewer than 75 carbon atoms and some of which comprise more than 75 carbon atoms.

Figure 6A:
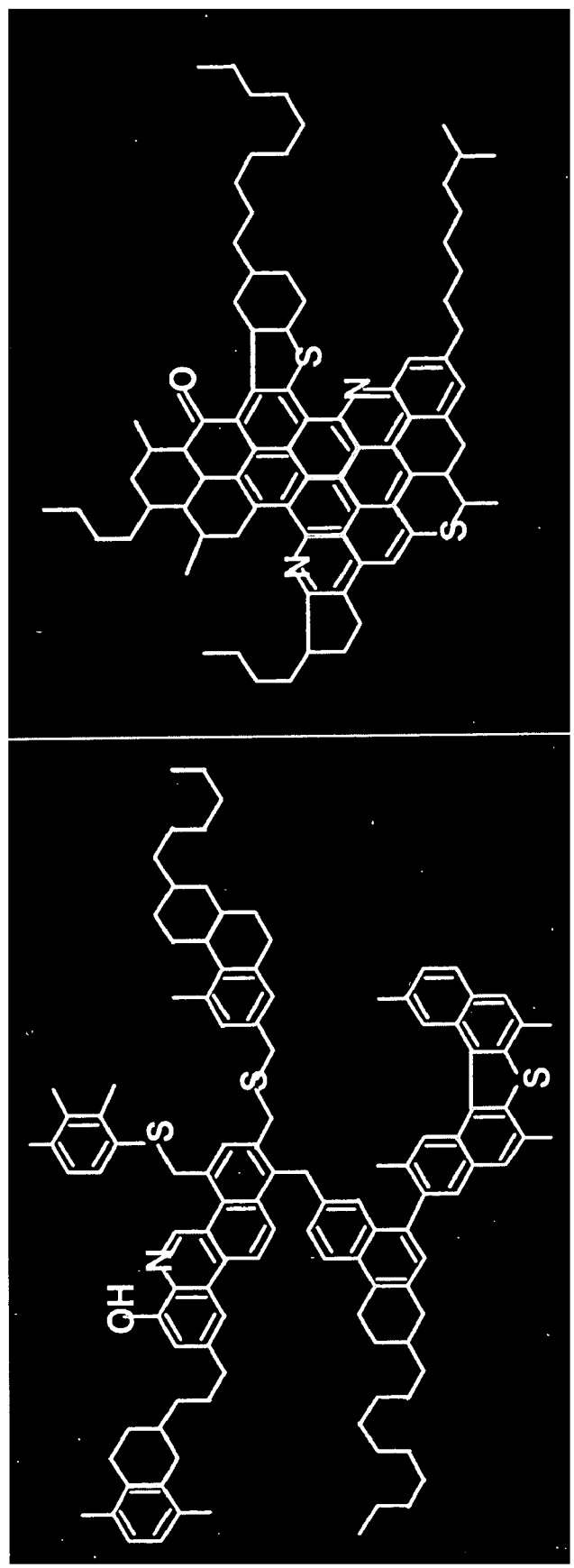
FIG. 6A illustrates the chemical formulation for certain asphaltene compounds.
Figure 6B:
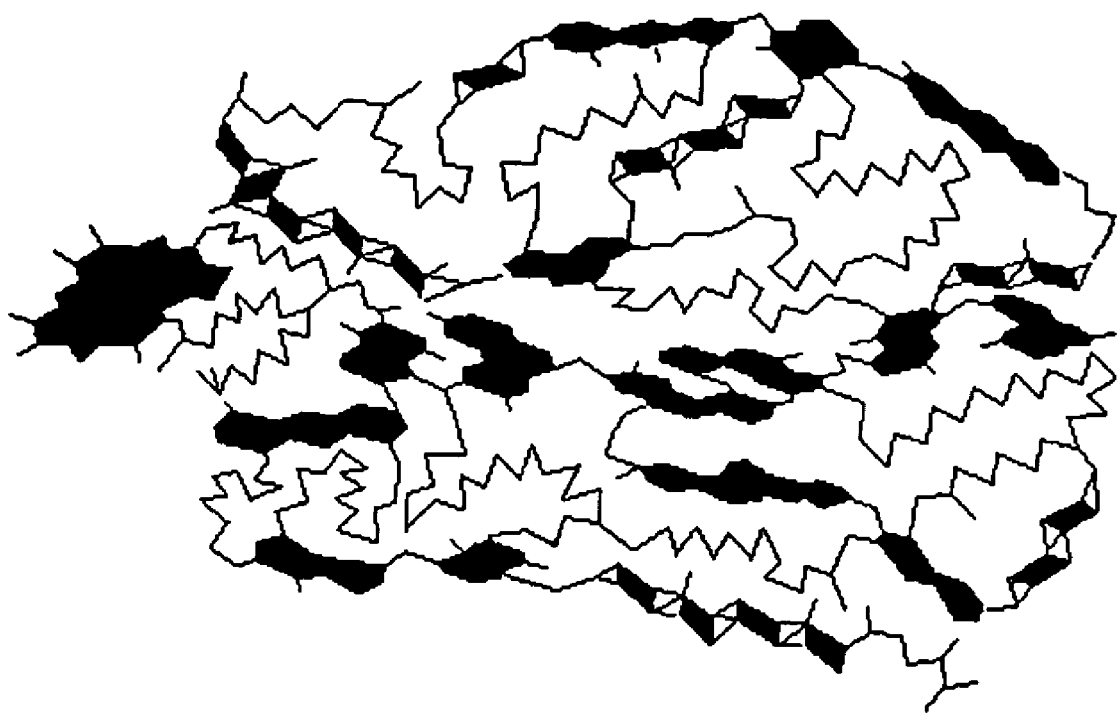
FIG. 6B illustrates the physical shape of the asphaltene compounds of FIG. 6A.

FIG. 6A illustrates two such asphaltene molecules. FIG. 6B graphically depicts an asphaltene having a molecular weight of about 7800 Daltons. Table I recites certain chemical differences between asphaltenes and paraffins.

TABLE I

|  | ASPHALTENE | PARAFFIN |
| --- | --- | --- |
| Dissolves in heptane | NO | YES |
| Crystalline | NO | YES |
| Melting Point | NO | YES |

A number of methods are known in the art to remove some or all of blockage materials 120 and/or 130.

One of the most frequent methods of paraffin reduction utilized in down hole treatment is often referred to as "Hot Oiling". Using this prior art method, heated refined oil (10-100 barrels) is pumped directly down the hole to re-liquefy the paraffin and clear the flow tube. Hopefully, some of the oil reaches the formation and also clears some of the fissures of paraffin theoretically resulting in increased production rates for a short period of time, generally from about 1 to about 7 days.

This prior art method may allow the corrosion inhibitor to actually protect the piping by contacting the steel piping. In actuality, much of the costly refined heated oil may not be recovered and the positive effects of this method may only be seen for a very short time with no guarantee of increased well performance.

The paraffin material that reforms typically comprises a much harder and tighter matrix than the original deposit, and is much more difficult to remove, particularly if calcium salts comprise part of the paraffin composition. Typically "Hot Oiling" applications will be performed one to two times per month. This method can be very expensive because the costs include heating, refining, trucking, manpower, and the cost of the lost down hole oil.

Other prior art methods utilize toluene and/or xylene to re-liquefy the paraffin and thick oil to a less viscous material. Typical applications of this product use from 20 barrels to 100 barrels down hole at a typical cost of $3.00 per gallon of product. This method re-liquefies the paraffin's using one or more volatile, very dangerous, cancer causing chemicals. These products potentially pollute the ground water and must be handled with extreme caution as indicated on each chemical's Material Safety Data Sheet. The paraffin and thick oil revert to their original state once these products have revolatilized causing deposits in flow lines or storage tank "dropout".

"Hot watering" is probably the least expensive and potentially least effective prior art method of paraffin removal. Hot water is injected directly down hole to remove paraffin from the walls of the tubing. This method typically treats just the tubing and not much of the formation itself. Some short-term benefits can be seen but typically the results are seen for only a day or two.

Certain prior art methods utilize a 15% muratic acid solution to remove paraffin. This method may appear cost effective, however the muratic acid will attack the mild steel piping and greatly accelerate corrosion rates, reduce pipe wall thickness, and result in holes in the down hole tubing.

Applicant's composition and method comprises a total system treatment, which treats the source of the buildup resulting in cleaner flow lines, down hole pipes, and storage tanks. Applicant's method utilizes an environmentally friendly solvent system, in optional combination with other systems, to increase the time between treatments while maximizing production rates.

Applicant's composition, and method using that composition, re-liquefies both paraffins and asphaltenes, without utilizing known carcinogens. In addition, Applicant's method increases oil production, increases gas production, removes blockage materials for a longer period of time, removes paraffins and/or asphaltenes in the oil field formation, reduces oil viscosity, reduces piping corrosion rates, removes paraffins and/or asphaltenes from oil transfer lines, and reduces oil viscosity in the holding tank.

Figure 2:
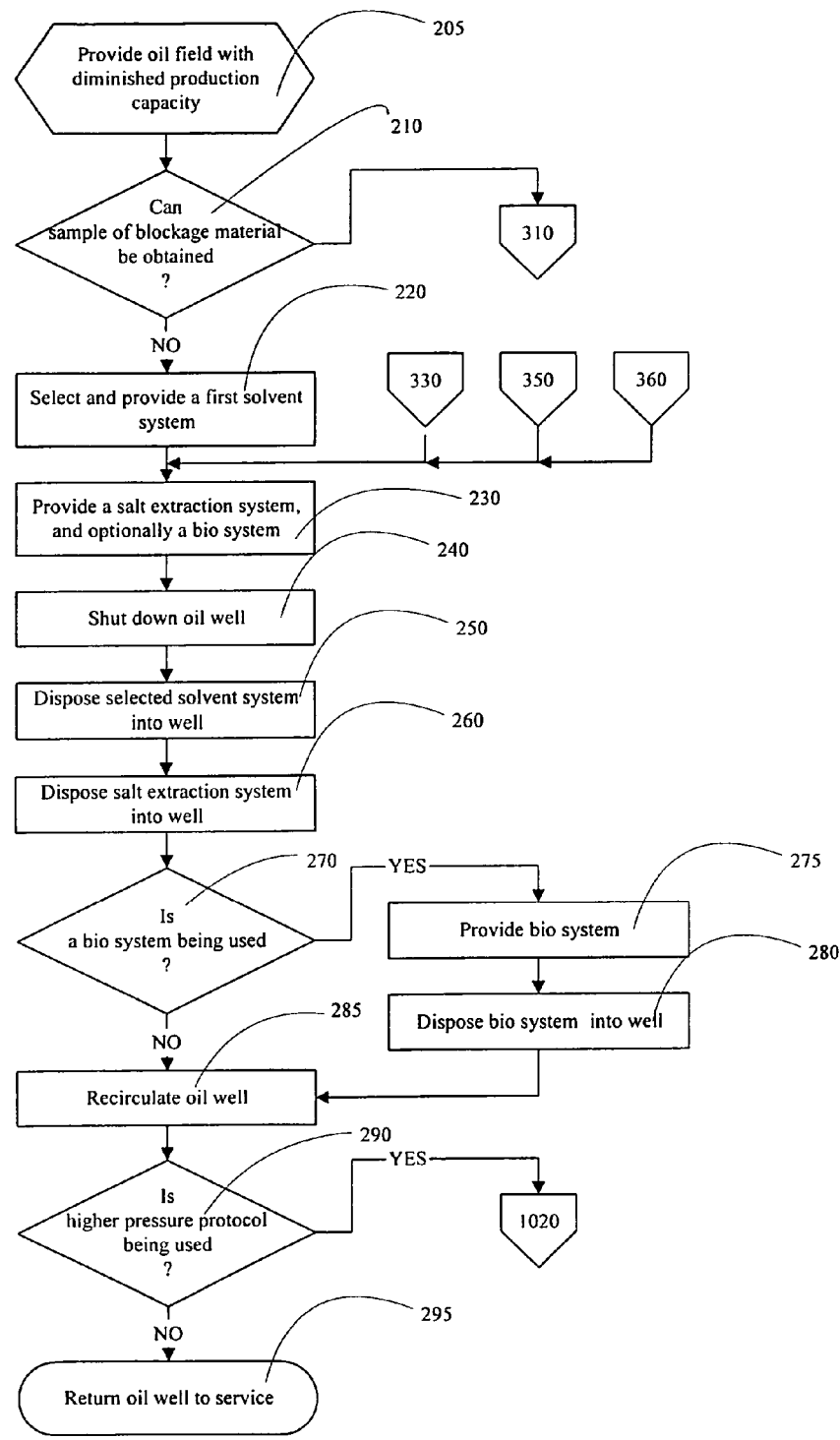
FIG. 2 is a flow chart summarizing certain steps of Applicant's method.

FIG. 2 summarizes the steps of Applicant's method. Referring now to FIG. 2, in step 205 the method provides an oil field having an oil well disposed therein, such as for example oil field 100, wherein the oil well, such as oil well 140 (FIG. 1) exhibits diminished production capacity resulting from the presence of one or more blockage materials, such as blockage materials 120 (FIG. 1) and/or blockage materials 130 (FIG. 1).

In step 210, Applicant's method determines if the compositions of the blockage materials will be analyzed. If the composition of the blockage materials will be analyzed, then the method transitions from step 210 to step 310.

Figure 3:
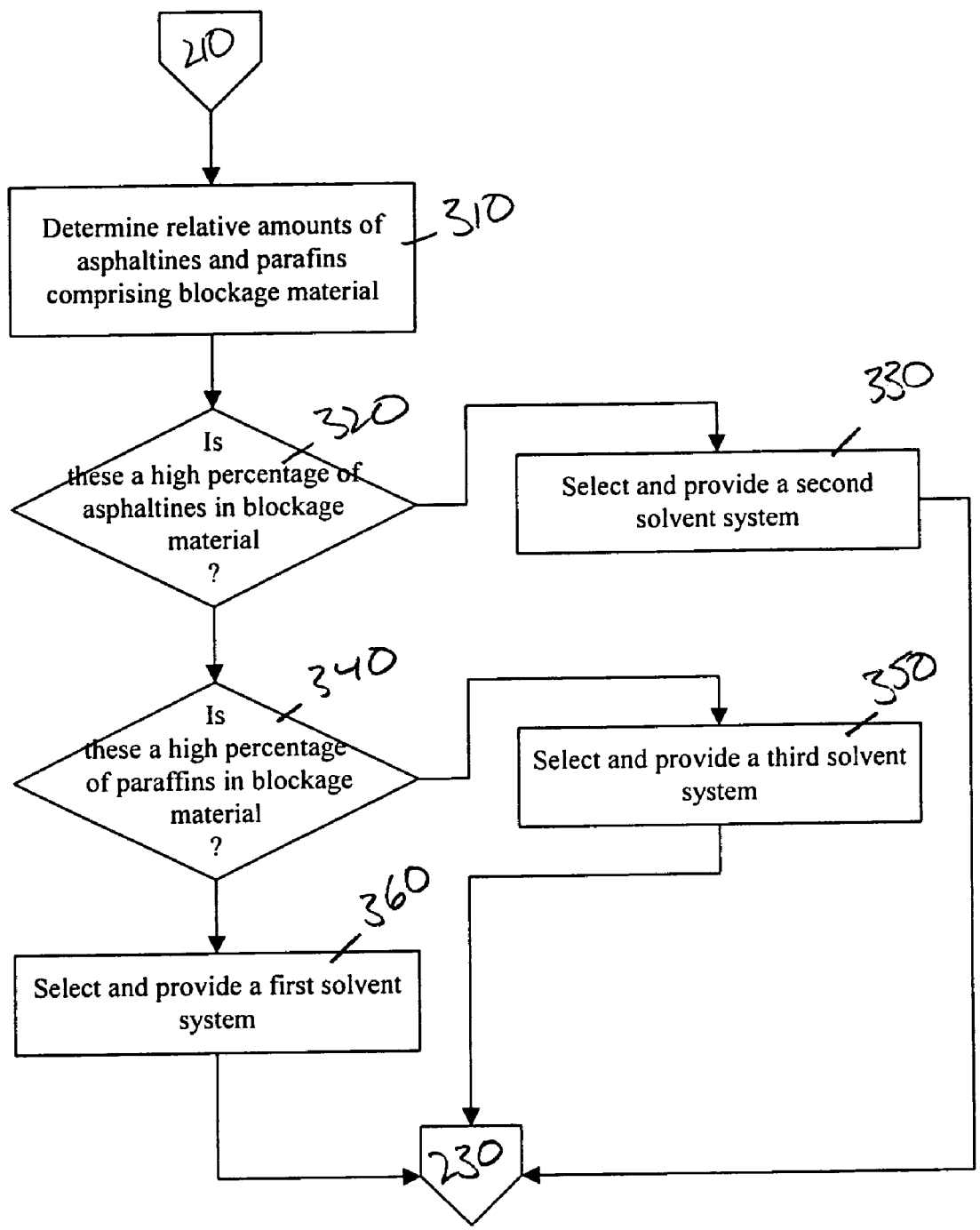
FIG. 3 is a flow chart summarizing certain optional steps of Applicant's method.

Referring now to FIG. 3, in step 310 Applicant's method determines the relative concentrations of asphaltenes and paraffins in the blockage materials. As described above, paraffins are generally soluble in n-heptane while asphaltenes are not. In certain embodiments, step 310 comprises treating either isolated blockage materials, or a sample of crude oil from the subject well, with heptane to remove the soluble paraffins. ASTM Method D3279-90 is then utilized to analyze the asphaltene component of the heptane insoluble fraction. In certain embodiments, step 310 further comprises dissolving the heptane-insoluble components in Tetrahydrofuran (THF), and analyzing that THF solution using gel permeation chromatography (GPC).

In step 320, Applicant's method determines, based upon the analysis of step 310, if the blockage materials comprise a substantially higher percentage of asphaltenes than paraffins. In certain embodiments, by "substantially higher percentage" Applicant means that the weight of asphaltene compounds in the blockage material comprise at least 2 times the weight of paraffin compounds in that blockage material.

If Applicant's method determines in step 320 that the blockage materials comprise a substantially higher percentage of asphaltenes than paraffins, then the method transitions from step 320 to step 330 wherein the method selects and provides a solvent system comprising about 34 volume percent of a first hydrocarbon solvent, about 46 volume percent of a second hydrocarbon solvent, and about 20 volume percent of one or more terpenoid compounds. Applicant's method transitions from step 330 to step 230 (FIG. 2).

In certain embodiments, Applicant's first hydrocarbon solvent comprises a hydrogenated, light petroleum distillate. In certain embodiments, Applicant's first hydrocarbon solvent comprises a mixture of hydrocarbon compounds, wherein that mixture is assigned Chemical Abstracts System ("CAS") Number 64742-47-8. In certain embodiments, Applicant's first hydrocarbon solvent comprises a product sold in commerce under the tradename Drakesol 165. In certain embodiments, Applicant's first hydrocarbon solvent comprises a product sold in commerce under the tradename Drakesol 2251. In certain embodiments, Applicant's first solvent system comprises deodorized kerosene.

In certain embodiments, Applicant's second hydrocarbon solvent comprises a hydrogenated, medium petroleum distillate. In certain embodiments, Applicant's second hydrocarbon solvent comprises a mixture of hydrocarbon compounds, where that mixture is assigned CAS No. 64742-46-7. In certain embodiments, Applicant's first hydrocarbon solvent comprises a product sold in commerce under the tradename Drakesol 205. In certain embodiments, Applicant's first hydrocarbon solvent comprises a product sold in commerce under the tradename Drakesol 2257.

By "terpenoid compound," Applicant means a hydrocarbon compound comprising between about 10 carbon atoms and about 15 carbon atoms, and further comprising an alkenyl moiety, and/or a cyclohexane moiety, and/or a cyclohexene moiety. For example, in certain embodiments Applicant's one or more terpenoid compounds comprise one or more of β-pinene (Compound I), menthene (Compound II), p-menthane (Compound III), limonene (Compound IV), and mixtures thereof. Embodiments of Applicant's composition which comprise limonene may comprise d-limonene, l-limonene, and/or mixtures thereof.

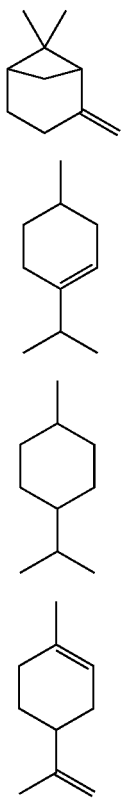

In certain embodiments, Applicant's terpenoid component comprises α-pinene, citrene, carvene, mixtures thereof, and the like.

Referring again to FIG. 3, if Applicant's method determines in step 320 that the blockage materials do not comprise a higher percentage of asphaltenes than paraffins, then the method transitions from step 320 to step 340 wherein the method determines if the blockage materials comprise a substantially higher percentage of paraffin compounds than asphaltene compounds. If Applicant's method determines in step 340 that the blockage materials comprise a substantially higher percentage of paraffin compounds than asphaltene compounds, then the method transitions from step 340 to step 350 wherein the method selects and provides a third solvent system comprising about 46 volume percent of Applicant's first hydrocarbon solvent, about 34 weight percent of Applicant's second hydrocarbon solvent, and about 20 weight percent of Applicant's one or more terpenoid compounds. Applicant's method transitions from step 350 to step 230 (FIG. 2).

If Applicant's method determines in step 340 that the blockage materials do not comprise a substantially higher percentage of paraffin compounds than asphaltene compounds, then the method transitions from step 340 to step 36o wherein the method selects and provides a first solvent system comprising about 34 volume percent of Applicant's first hydrocarbon solvent, about 34 volume percent of Applicant's second hydrocarbon solvent, and about 32 volume percent of Applicant's one or more terpenoid compounds. Applicant's method transitions from step 360 to step 230 (FIG. 2).

Referring once again to FIG. 2, if Applicant's method determines that the composition of the blockage materials will not be determined, then the method transitions from step 210 to step 220 wherein the method provides Applicant's first solvent system described above.

In step 230, Applicant's method provides a salt extraction system. In certain embodiments, Applicant's salt extraction system comprises a mixture of humic acid and fulvic acid. In certain embodiments, Applicant's humic/fulvic acid mixture comprises a weight ratio from about 95:5 humic acid/fulvic acid to about 5:95 humic acid/fulvic acid. In certain embodiments, Applicant's mixture of humic acid and fulvic acid are mixed in a formulation further comprising Urea, Potassium Hydroxide, mild Phosphoric Acid, mixtures thereof, and the like.

Humic acid comprises acidic materials extracted from Leonardite, where those acidic extracts are soluble in alkali, but insoluble in acid, methyl ethyl ketone, and methyl alcohol. Fulvic acid comprises acidic materials extracted from Leonardite, where those acidic extracts are soluble in alkali, acid, methyl ethyl ketone, and methyl alcohol. As those skilled in the art will appreciate, Leonardite comprises a soft, brown coal-like deposit found in conjunction with deposits of lignite.

Figure 7:
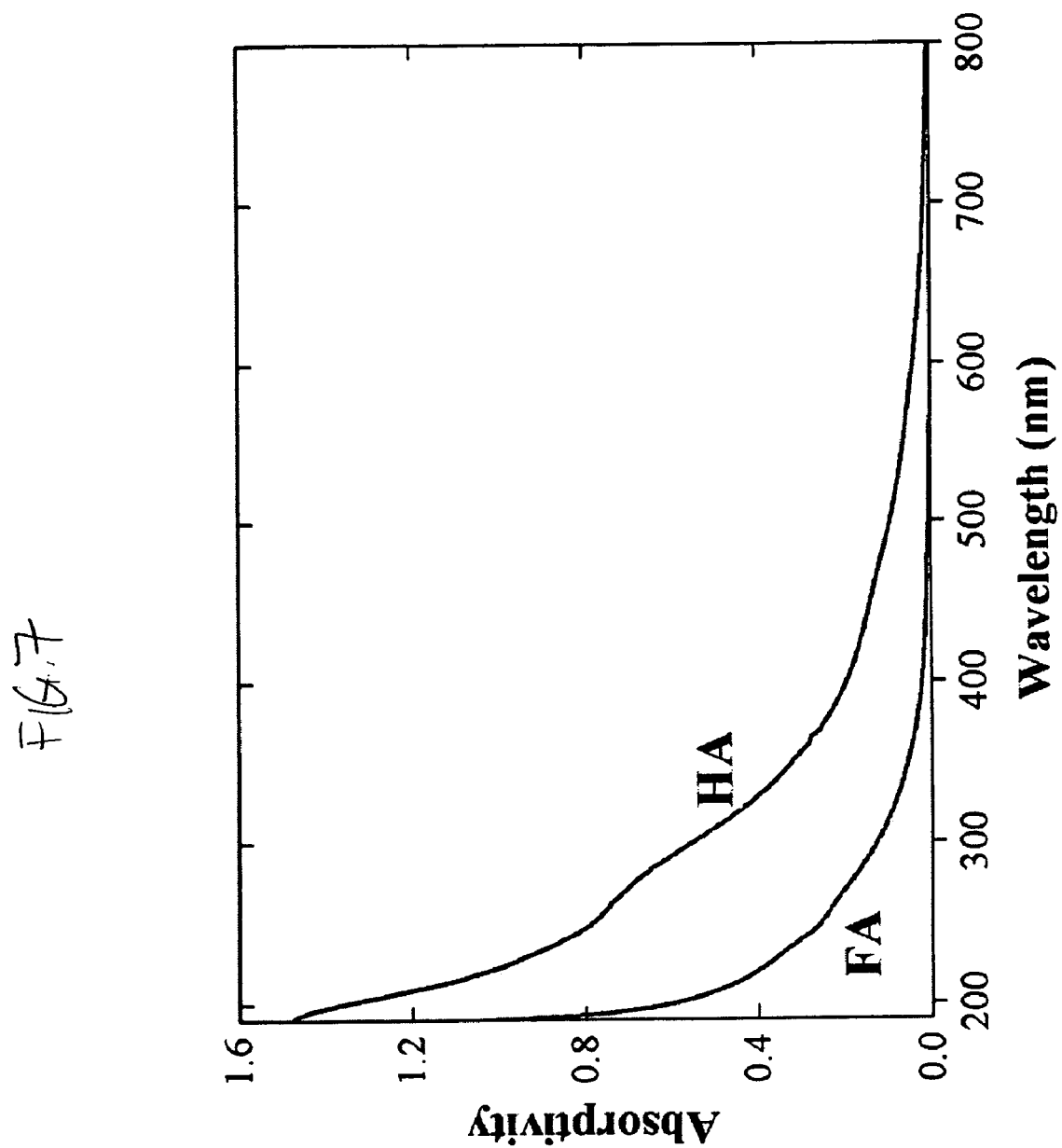
FIG. 7 comprises a UV absorption spectrum for Humic Acid and Fulvic Acid.
Figure 8:
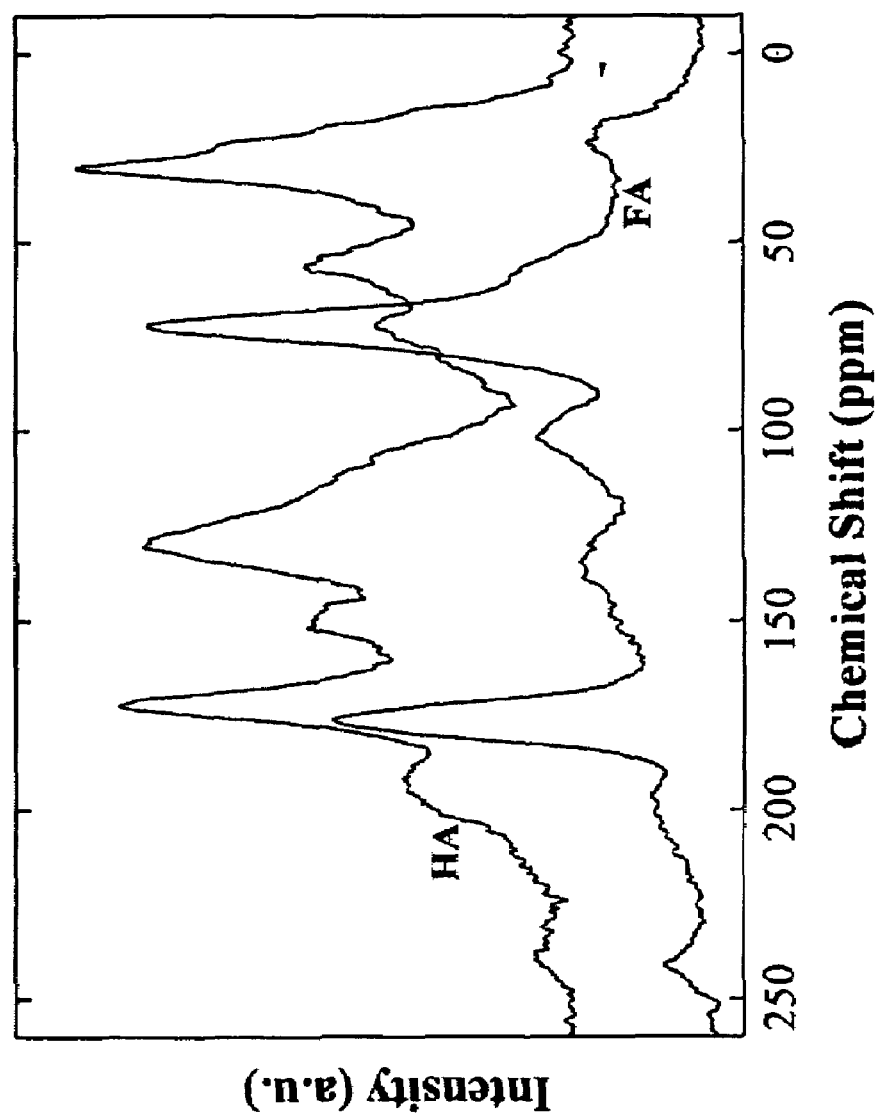
FIG. 8 comprises the $^{13}C$ nuclear magnetic resonance spectra of Humic Acid and Fulvic Acid.
Figure 9:
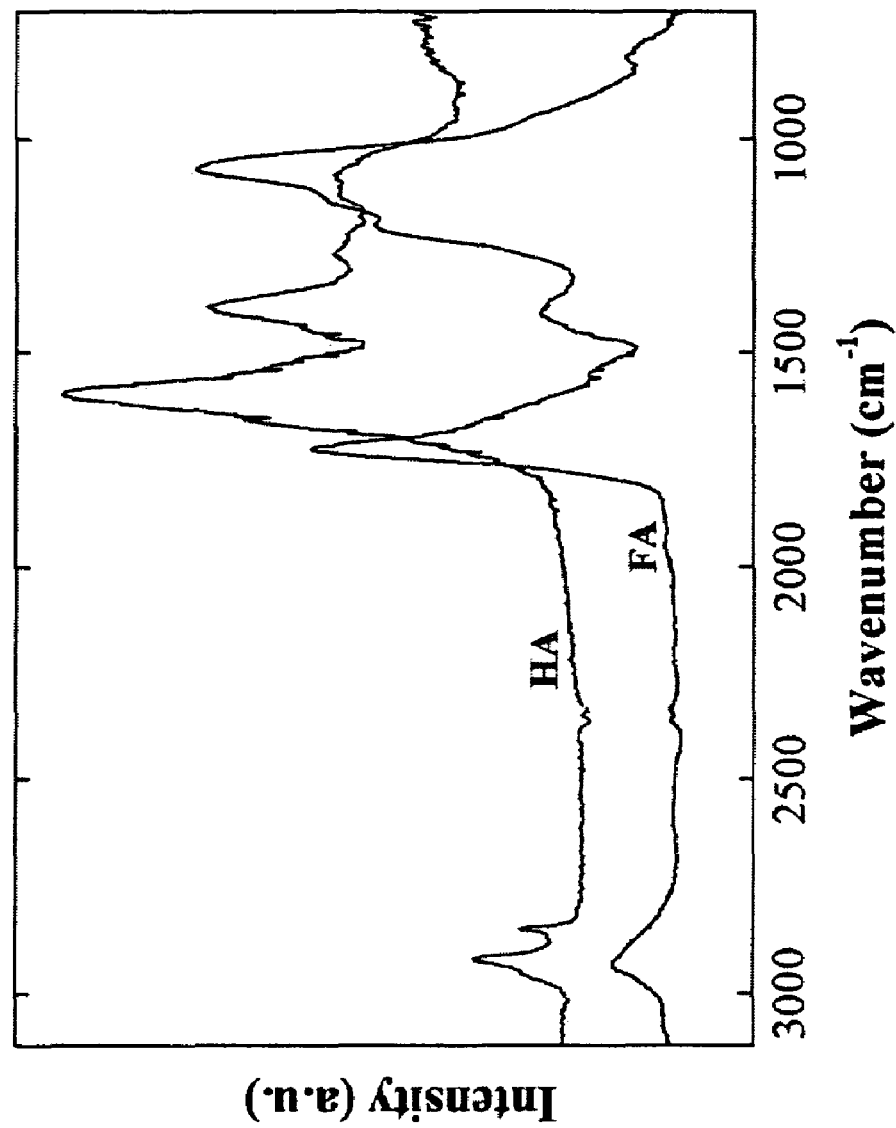
FIG. 9 graphically depicts the Fourier Transform Infrared spectra of Humic Acid and Fulvic Acid.

FIG. 7 graphically depicts the UV/visible spectra for both humic acid (HA) and fulvic acid (FA). FIG. 8 graphically depicts the $^{13}C$ nuclear magnetic resonance spectra of HA and FA. FIG. 9 graphically depicts the Fourier Transform Infrared spectra of HA and FA.

In step 240, Applicant's method discontinues operation of the oil well to be treated. By "discontinue operation," Applicant means discontinuing the extraction of liquids and/or gases from the oil well.

Figure 5:
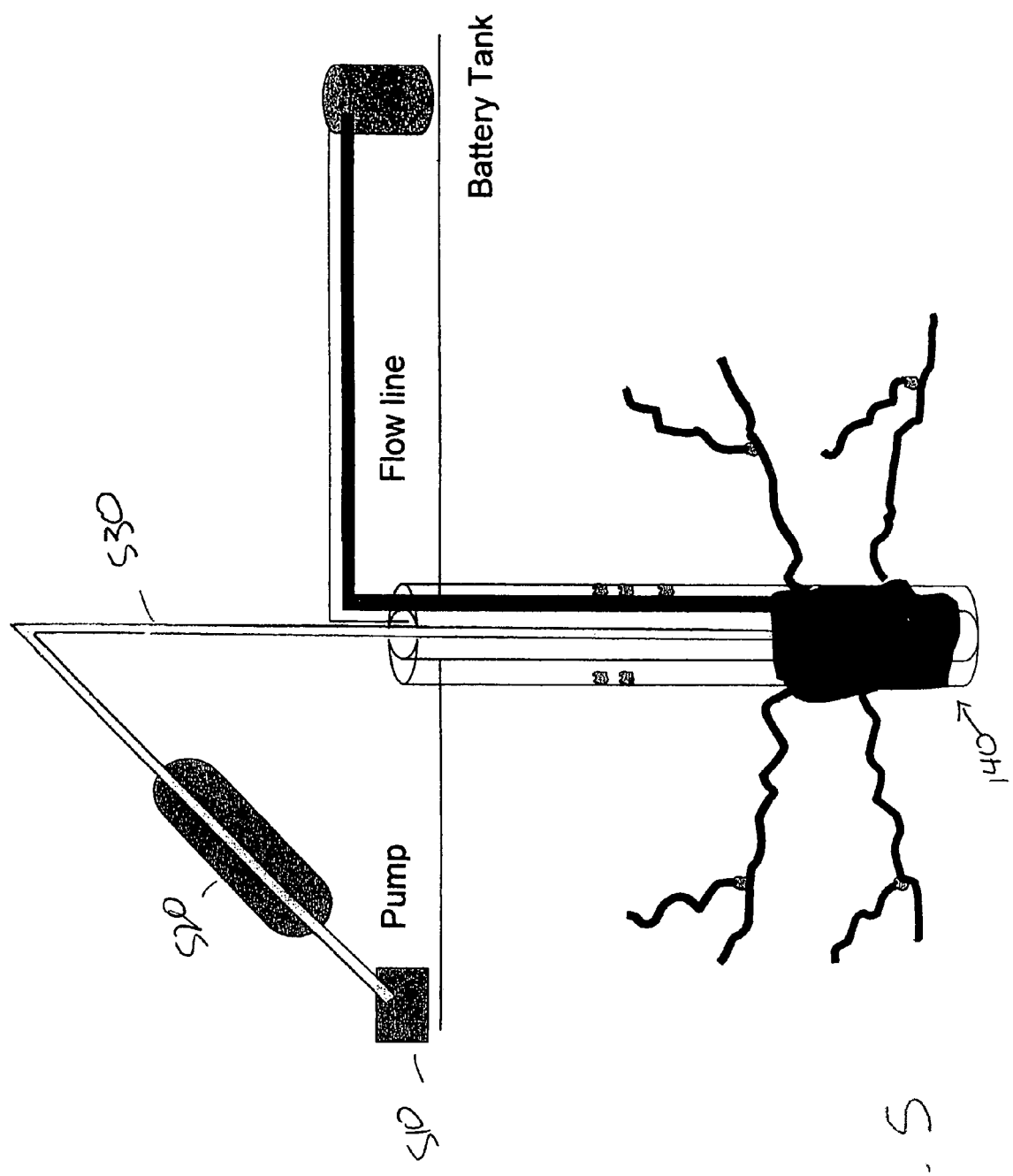
FIG. 5 illustrates the apparatus used to dispose or inject Applicant's formulation into the oil well field of FIG. 1.

Referring now to FIGS. 2, 3, and 5, in step 250, Applicant's method disposes the selected solvent system of step 230, or step 330, or step 350, or step 360, into the oil well, such as well 140 (FIG. 1). In certain embodiments, step 250 includes disposing between about 10 gallons to about 3 drums of the selected solvent system in vessel 510, and pumping that solvent system from vessel 510 into well 140 using pump 520 and piping 530.

Applicant's method transitions from step 250 to step 260 wherein the method pumps Applicant's salt extraction system into the oil well, such as for example well 140, immediately after performing step 250. By "immediately," Applicant means within about 2 minutes. In certain embodiments, step 260 includes disposing between about 2 gallons to about 10 gallons of Applicant's salt extraction composition into vessel 410 and pumping that solvent system from vessel 410 into well 140 using pump 420 and piping 430.

In step 270, Applicant's method determines if Applicant's bio system will be utilized. If Applicant's bio system is not being utilized, then the method transitions from step 270 to step 285. Alternatively, if Applicant's bio system is being utilized, then the method transitions from step 270 to step 275 wherein the method provides a bio system.

Applicant's bio system comprises paraffin eating bacteria. Applicant's bio system comprises a dry powder which is re-circulated and grown in an aerated tank for 24 hours while being fed a combination of organic nutrients, which enable a large colony count of paraffin eaters (4 billion cfu lml).

Applicant's bio system is injected down hole, and mixed with the flush water, to provide long-term paraffin elimination in the formation. The greatly increased bacteria colony count, along with the "in situ" bacteria already existing in the formation, proliferate and thrive on paraffin, resulting in long term paraffin reduction in the formation and an increase in time between down hole treatments. Use of Applicant's bio system also results in a higher baseline of oil production and/or gas production for that well.

The prior art teaches that bacteria may cause corrosion. Prior art methods utilize anaerobic bacteria, such as for example IRB (Iron Reducing Bacteria) or SRB's (Sulfate Reducing Bacteria). These anaerobic bacteria could, and did, tend to cause corrosion of piping. In marked contrast, Applicant's bio system comprises aerobic bacteria which do not attack iron or other metals.

In certain embodiments, Applicant's bio system comprises *Arthrobacter globiformis, Arthrobacter citreus, Nitrosomonas, Nitrobacter, Bacillus licheniformis, Bacillus amyloloquefaciens, Bacillus subtilis, Bacillus megaterium,* and *Bacillus pumilus. Arthrobacters* comprise gram positive, aerobic rods that constitute a large portion of the aerobic chemoheterotrophic population of soil bacteria. In certain embodiments, Applicant's bio system further comprises sea weed cream, Leonardite extract, fish parts, and combinations thereof.

In certain embodiments, step 275 further comprises "growing" Applicant's bio system, wherein the components comprising Applicant's bio system, without the water, are mixed in a reaction vessel for about 24 hours, wherein that reaction vessel comprises the growing biosystem and a head space, wherein the oxygen level of that head space is maintained at about 2-3 ppm for the 24 hour growth period.

Applicant's method transitions from step 275 to step 280 wherein the method adds the water component to Applicant's bio system, and pumps that aqueous bio system into the well. In certain embodiments, step 280 comprises disposing between about 5 barrels and about 20 barrels of Applicant's aqueous bio system into the well. In certain embodiments, Applicant's aqueous bio system comprises about 10-30 weight percent aerobic bacteria, about 10-20 weight percent water, about 10-30 weight percent sea weed cream, about 20-30 weight percent Leonardite extract, and about 30-40 weight percent fish parts.

Applicant's method transitions from step 280 to step 285 wherein the well is recirculated for between about 6 hours to about 24 hours to allow contact between Applicant's solvent system, Applicant's salt extraction system, and optionally Applicant's bio-system, and the blockage materials disposed in oil field and oil well. In steps 250, 260, 280, and 285, the oil well and oil field are maintained at ambient pressure.

Applicant's method transitions from step 285 to step 290 wherein the method determines if a high pressure treatment protocol will be used. If Applicant's method elects not to use Applicant's high pressure protocol, then the method transitions from step 290 to step 295 wherein the oil well is placed back into service.

In certain embodiments, Applicant's method comprises the steps recited in FIG. 2, in optional combination with the steps of FIG. 3. In other embodiments, Applicant's method comprises the steps recited in FIG. 4, in optional combination with the steps recited in FIG. 3. In yet other embodiments, Applicant's method comprises the steps recited in FIGS. 2 and 4, in optional combination with the steps recited in FIG. 3.

Figure 4:
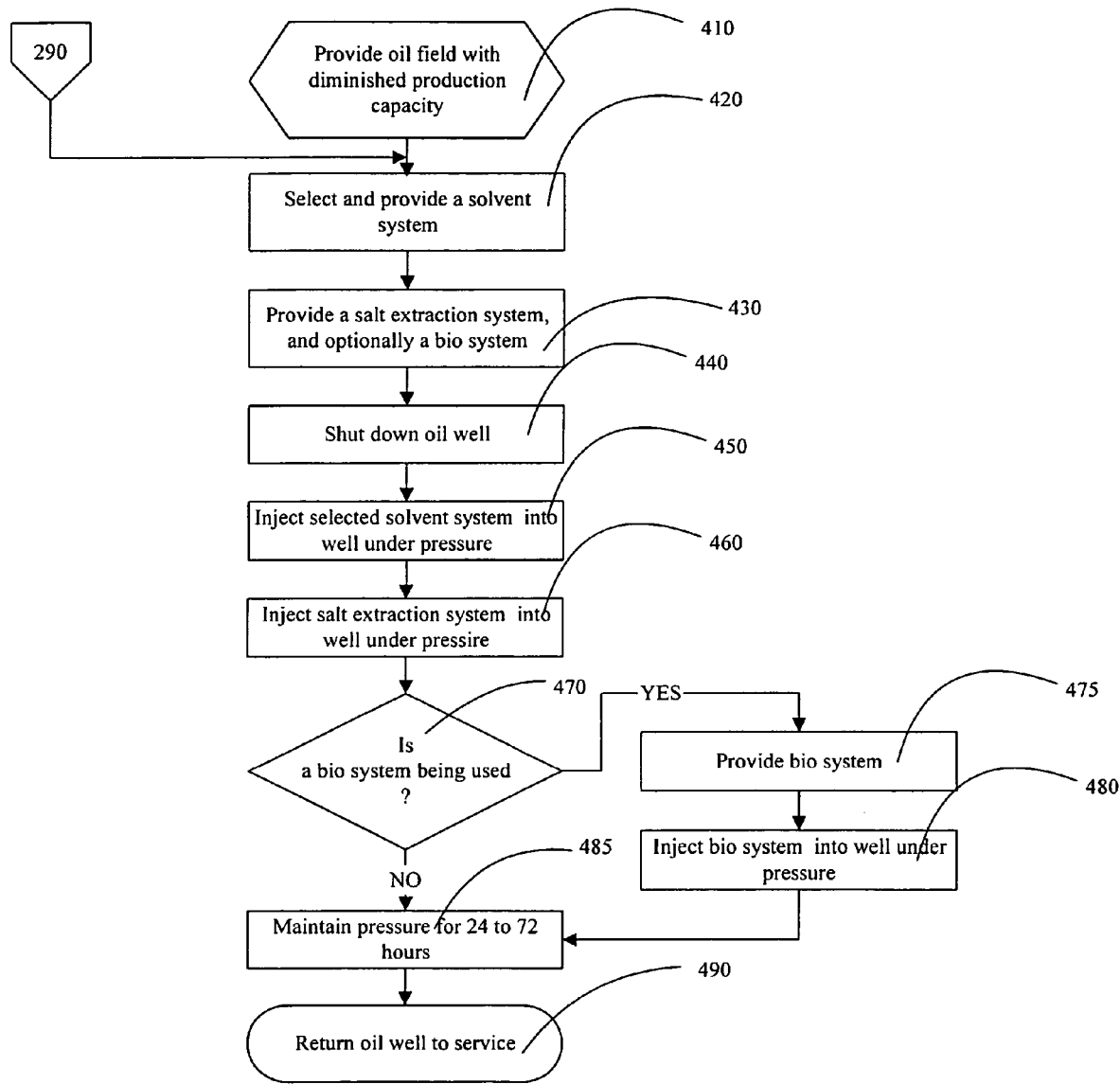
FIG. 4 is a flow chart summarizing certain additional optional steps of Applicant's method.

Referring now to FIG. 4, steps 410, 430, 440, 470, 475, and 490, comprise the elements of steps 205, 230, 240, 270, 275, and 295, respectively, as described hereinabove. In embodiments wherein Applicant's method comprises the steps recited in FIG. 4 without first utilizing the steps recited in FIG. 2, step 420 comprises the elements of step 210 as described herein above, in optional combination with the elements of steps 310, 320, 330, 340, 350, and 360, as described hereinabove.

In embodiments wherein Applicant's method utilizes the steps of FIG. 2, in optional combination with the steps of FIG. 3, Applicant's method transitions from step 290 (FIG. 2) to step 420. In these embodiments, step 420 comprises using the solvent system previously selected in step 210, or in step 330, or in step 350, or in step 360, as described hereinabove.

In step 450, Applicant's method injects the selected solvent system into the well under pressure. In certain embodiments, the pressure of step 450 is between about 200 psi and about 1000 psi. in excess of typical formation pressure. In step 460, Applicant's method injects Applicant's salt extraction system into the well under pressure. In certain embodiments, the pressure of step 460 is between about 200 psi and about 1000 psi. in excess of typical formation pressure.

In step 480, Applicant's method injects Applicant's bio system into the well under pressure. In certain embodiments, the pressure of step 480 is between about 200 psi and about 1000 psi. in excess of typical formation pressure. In step 485, Applicant's method maintains a pressure of between about 200 psi and about 1000 psi in excess of typical formation pressure in the well for between about 24 to about 72 hours.

In certain embodiments, individual steps recited in FIGS. 2, 3, and/or 4, may be combined, eliminated, or reordered. For example, in certain embodiments Applicant's method includes the steps recited in FIG. 2 only. In other embodiments, Applicant's method includes the steps recited in FIGS. 2 and 3.

In yet other embodiments, Applicant's method includes the steps recited in FIG. 4 only. In still other embodiments, Applicant's method includes the steps of FIGS. 3 and 4. Finally in still other embodiments, Applicant's method includes the steps of FIGS. 2, 3, and 4.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to enhance recovery from an oil well, comprising the steps of:
    supplying a mixture of petroleum distillates and one or more terpenoid compounds;
    supplying a salt extraction formulation comprising a mixture of humic acid and fulvic acid;
    discontinuing the extraction of materials from said oil well;
    disposing said mixture of petroleum distillates and one or more terpenoid compounds into said oil well;
    disposing said salt extraction formulation into said oil well;
    recirculating said oil well;
    returning said oil well to service.

2. The method of claim 1, wherein said supplying a mixture of petroleum distillates further comprises supplying a solvent system comprising a mixture of hydrogenated petroleum light distillates and hydrogenated petroleum medium distillates.

3. The method of claim 2, wherein said supplying a solvent system further comprises supplying a mixture comprising about 34 volume percent of said hydrogenated petroleum light distillates, about 34 weight percent of said hydrogenated petroleum medium distillates, and about 32 volume percent of said one or more terpenoid compounds.

4. The method of claim 1, wherein said one or more terpenoid compounds comprise one or more of pinene, menthene, menthane, and limonene.

5. The method of claim 1, further comprising the steps of:
obtaining a sample of blockage material from said oil well;
determining if the weight of asphaltene compounds in said blockage materials is at least twice the weight of paraffins in said blockage material;
wherein said supplying a mixture of petroleum distillates and terpenoid compounds step further comprises:
operative if the weight of asphaltene compounds in said blockage materials is at least twice the weight of paraffins in said blockage material, supplying a second solvent system comprising about 34 volume percent of hydrogenated petroleum light distillates, 46 volume percent of hydrogenated petroleum medium distillates, and 20 volume percent of one or more terpenoid compounds;
operative if the weight of paraffins in said blockage materials is at least twice the weight of asphaltene compounds in said blockage material, supplying a third solvent system comprising about 46 volume percent of hydrogenated petroleum light distillates, 34 volume percent of hydrogenated petroleum medium distillates, and 20 volume percent of one or more terpenoid compounds;
operative if the weight of asphaltene compounds in said blockage materials is not at least twice the weight of paraffins in said blockage material and if the weight of paraffins in said blockage materials is not at least twice the weight of asphaltene compounds in said blockage material, supplying a first solvent system comprising about 34 volume percent of said hydrogenated petroleum light distillates, about 34 weight percent of said hydrogenated petroleum medium distillates, and about 32 volume percent of said one or more terpenoid compounds.

6. The method of claim 1, further comprising the steps of:
supplying a bio system comprising one or more aerobic bacteria; and
disposing said bio system into said well after said discontinuing step and before said recirculating step.

7. The method of claim 6, wherein said supplying a bio system comprising one or more aerobic bacteria further comprises supplying a bio system comprising one or more of *Arthrobacter globiformis, Arthrobacter citreus, Nitrosomonas, Nitrobacter, Bacillus licheniformis, Bacillus amyloloquefaciens, Bacillus subtilis, Bacillus megaterium,* and *Bacillus pumilus.*

8. The method of claim 6, wherein said supplying a bio system step further comprises supplying a bio system comprising said one or more aerobic bacteria, water, sea weed cream, Leonardite extract, and percent fish parts.

9. The method of claim 8, wherein said supplying a bio system step further comprises supplying a bio system comprising about 10-30 weight percent aerobic bacteria, about 10-20 weight percent water, about 10-30 weight percent sea weed cream, about 20-30 weight percent Leonardite extract, and about 30-40 weight percent fish parts.

10. The method of claim 1, further comprising after said recirculating step the steps of:
injecting said mixture of petroleum distillates and terpenoid compounds into said oil well using a first pressure, wherein said first pressure is greater than ambient atmospheric pressure; and
injecting said salt extraction formulation into said oil well using a second pressure, wherein said second pressure is greater than ambient atmospheric pressure;
maintaining a third pressure in said well for 24 to 72 hours, wherein said third pressure is greater than ambient atmospheric pressure.

11. The method of claim 10 further comprising:
supplying a bio system comprising one or more aerobic bacteria; and
injecting prior to said maintaining step said bio system into said well using a fourth pressure, wherein said fourth pressure is greater than ambient atmospheric pressure.

12. The method of claim 11, wherein said first pressure is between about 200 psi and about 1000 psi, and wherein said second pressure is between about 400 psi and about 1200 psi, and wherein said third pressure is between about 600 psi and about 1400 psi, and wherein said fourth pressure is between about 800 psi and about 1600 psi.

13. A formulation to dispose in an oil well to enhance recovery therefrom, comprising:
a mixture of petroleum distillates and one or more terpenoid compounds; and
a salt extraction formulation comprising a mixture of humic acid and fulvic acid.

14. The formulation of claim 13, wherein said mixture of petroleum distillates is selected from the group consisting of hydrogenated petroleum light distillates and hydrogenated petroleum medium distillates.

15. The formulation of claim 14, wherein said one or more terpenoid compounds comprises at least one of pinene, menthene, menthane, and limonene.

16. The formulation of claim 13, further comprising: a bio system comprising one or more aerobic bacteria.

17. The formulation of claim 16, wherein said a bio system further comprises water, sea weed cream, Leonardite extract, and percent fish parts.

18. The formulation of claim 17, wherein said bio system comprises about 10-30 weight percent aerobic bacteria, about 10-20 weight percent water, about 10-30 weight percent sea weed cream, about 20-30 weight percent Leonardite extract, and about 30-40 weight percent fish parts.

* * * * *